(12) United States Patent
Su

(10) Patent No.: US 8,371,865 B1
(45) Date of Patent: Feb. 12, 2013

(54) CARD CONNECTOR

(75) Inventor: Yu-hung Su, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/253,959

(22) Filed: Oct. 5, 2011

(51) Int. Cl.
*H01R 13/62* (2006.01)

(52) U.S. Cl. .................. 439/155; 439/157; 439/159

(58) Field of Classification Search .............. 439/152, 439/155, 157, 159, 160
See application file for complete search history.

(56) References Cited

U.S. PATENT DOCUMENTS

| | | | |
|---|---|---|---|
| 5,179,505 A * | 1/1993 | Matsuo | 361/754 |
| 5,544,009 A * | 8/1996 | Hosoya et al. | 361/679.32 |
| 6,390,836 B1 * | 5/2002 | Motegi et al. | 439/159 |
| 6,406,322 B1 * | 6/2002 | Barringer et al. | 439/377 |
| 7,448,912 B1 * | 11/2008 | Shiue et al. | 439/630 |
| 7,568,928 B2 * | 8/2009 | Hou et al. | 439/188 |
| 7,819,678 B2 * | 10/2010 | Ye et al. | 439/159 |
| 8,109,773 B1 * | 2/2012 | Little et al. | 439/159 |
| 8,147,262 B1 * | 4/2012 | Su et al. | 439/159 |

* cited by examiner

*Primary Examiner* — Briggitte R Hammond
(74) *Attorney, Agent, or Firm* — Cheng-Ju Chiang

(57) ABSTRACT

The present invention is to provide a card connector, which comprises a shell body, an insulating main body, a card carrier for supporting an electric card, and a plurality of conductive terminals embedded within the insulating main body. The card connector further comprises a retreating-card apparatus, which comprises an actuator, a slider actuated by the actuator, and a linkage mechanism linked up with the slider. The linkage mechanism is disposed on a rear end of the card carrier. When the actuator is acted to push the slider moving along a first direction, the linkage mechanism is linked with the slider to push the card carrier in a second direction opposite to the first direction so that the card carrier and the electric card are removed from the insulating main body. Thus, the card connector according to the present invention reveals light-thin, compact-construct, sort-assembly time and lower-assembly cost.

8 Claims, 5 Drawing Sheets

CARD CONNECTOR

BACKGROUND OF THE INVENTION

1. Field of the Invention

The present invention generally relates to a card connector, and in particular to a SIM (Subscriber Identity Module) card connector.

2. The Related Arts

A SIM card connector is widely applied in various kinds of the electronic communication equipments, such as a mobile phone. The SIM card connector is disposed on a PCB (Printed Circuit Board) and provided for a SIM card inserting therein to achieve a communicative transmission between the SIM card and PCB, thereby accomplishing data identification thereof.

FIG. 1 shows a traditional SIM card connector 50 comprises a shell body 51, a plurality of grooves 511 formed on a bottom wall of the shell body 51, a plurality of electric conductive terminals 512 respectively embedded within the grooves 511, and a plurality of electric conductive terminals 512 welded onto and electrically connected to a PCB (not shown). The SIM card connector 50 further comprises a fastener 52 mounted on the shell body 51, wherein the fastener 52, the bottom wall and side walls of the shell body 51 defines an inserting space for inserting a SIM card 53.

With the present electronic communication equipment such as a mobile phone trending light, thin and ingenious, a development of the SIM card connector used in the mobile phone should comply toward a direction of light, thin and ingenious. However, the above mentioned traditional SIM card connector has a larger volume which occupies more space in the electronic communication equipment so that it can not be suited for the actual requirement at present. Besides, since the SIM card connector has no any retreating-card apparatus, it invokes inconvenient for users to manually remove the SIM card therefrom.

Therefore, there is a need for providing a card connector, to solve existing problems in the conventional technology.

SUMMARY OF THE INVENTION

To resolve the drawbacks of the above-mentioned prior art, an objective of the present invention is to provide a card connector, which reveals a light, thin and compact structure in assembly of saving both time and cost.

To achieve the above objective, the present invention provides a card connector which comprises a shell body, an insulating main body, a card carrier for supporting an electric card, a plurality of conductive terminals embedded within the insulating main body, and a retreating-card apparatus, wherein the retreating-card apparatus comprises an actuator, a slider actuated by the actuator, and a linkage mechanism linked with the slider positioned at the rear end of the card carrier. While acted in a first direction, the actuator pushes the slider to slide along the first direction and thereby links up with the linkage mechanism to push the card carrier in a second direction opposite to the first direction so as to withdraw the card carrier and the electric card from the insulating main body.

In one embodiment of the present invention, the linkage mechanism comprises a cam, a fixed axle and a driven member, wherein the cam is actuated by the slider, and revolves round the fixed axle, so that the driven member pushed the card carrier.

In another embodiment of the present invention, the actuator is a pin. One end of the slider links up with the pin and the other end of the slider links up with the cam.

In another embodiment of the present invention, the insulating main body comprises a first installing portion used for supporting the card carrier, and a second installing portion used for setting the slider.

In another embodiment of the present invention, the insulating main body comprises a third installing portion used for disposing the cam thereon, and the fixed axle is fixed on the third installing portion.

In another embodiment of the present invention, the card connector further comprises a latching member used for locking the card carrier, and the latching member has an abutting portion used for abutting against a bottom of the card carrier.

In another embodiment of the present invention, the card connector further comprises a switch terminal embedded within a side of the insulating main body.

In another embodiment of the present invention, the card carrier forms in a frame-like, and the card carrier is formed with an installing groove for supporting the electric card.

As described above, the retreating-card apparatus of the card connector according to the present invention is disposed inside the card connector to construct lightly, thinly and compactly, so as to save an inner space of the electric equipment as a mobile phone with a volume progressively trending to light and thin, so that it can be well-suited for the light and thin electric equipment. Besides, the present invention is constructed simply and designed reasonably, so that it can shorten the time and lower the cost of assembling the card connector. Further, in the present invention, by the actuator actuating the slider, the linkage mechanism is linked up to push the card carrier, and thereby withdraws the card carrier and the card from the insulating main body. Thus, such a retreating-card method contributes greatly convenient, quick and reliable.

BRIEF DESCRIPTION OF THE DRAWINGS

The present invention will be apparent to those skilled in the art by reading the following description of a preferred embodiment of the present invention, with reference to the attached drawings, in which.

DETAILED DESCRIPTION OF THE PREFERRED EMBODIMENT

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
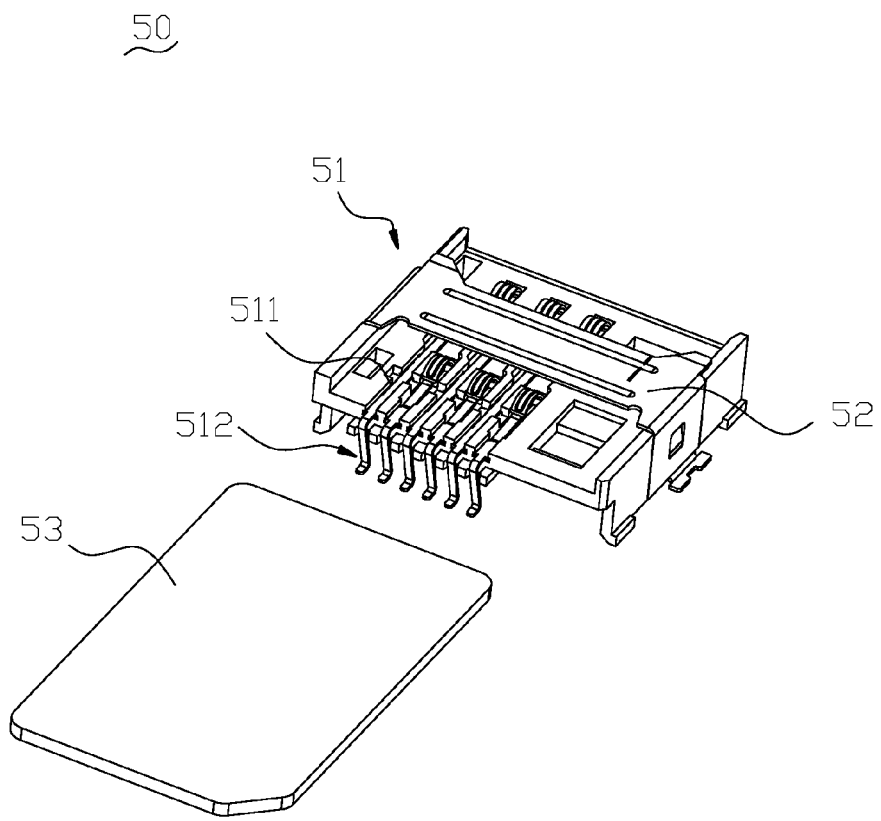
FIG. 1 is a perspective view showing a traditional SIM (Subscriber Identity Module) card connector.
Figure 2:
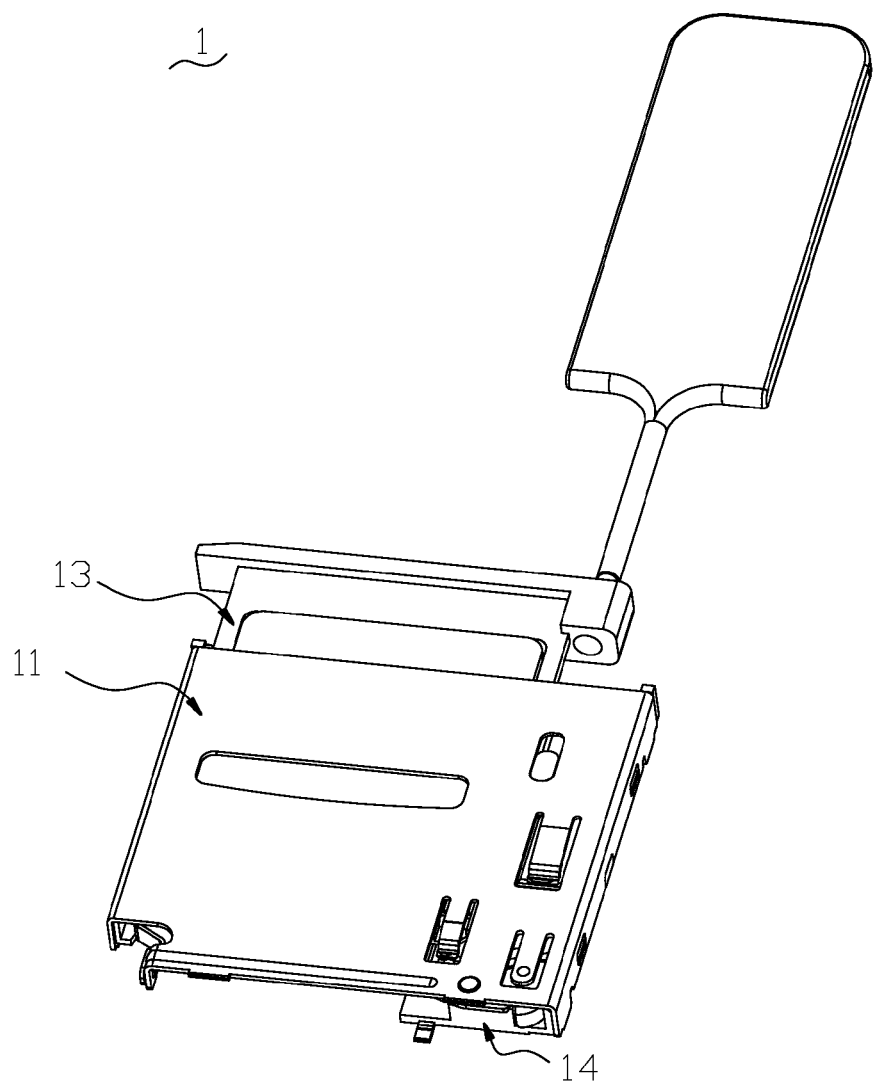
FIG. 2 is a perspective view showing a card connector according to a preferred embodiment of the present invention.
Figure 3:
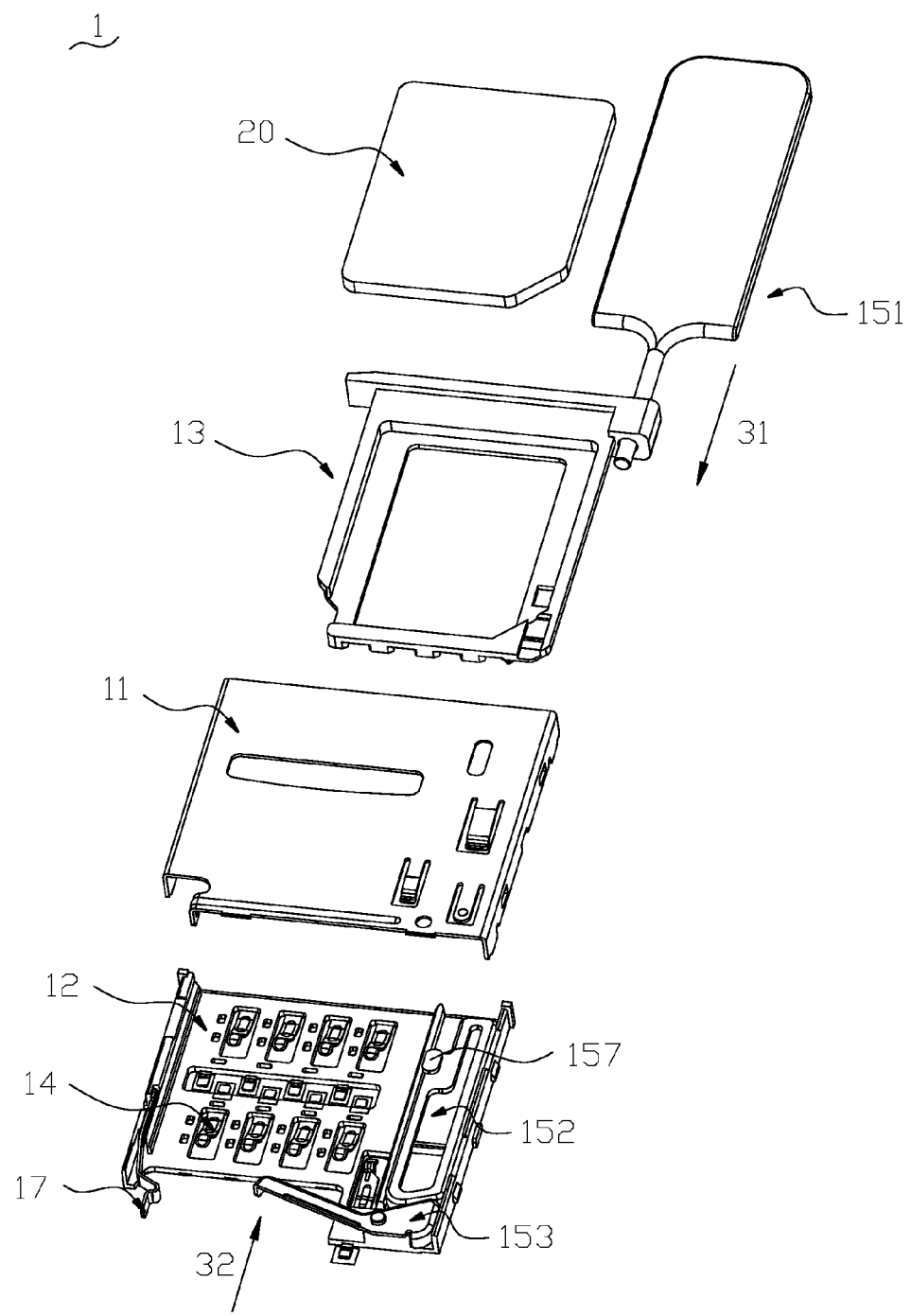
FIG. 3 is an exploded view of the card connector shown in FIG. 2.
Figure 4:
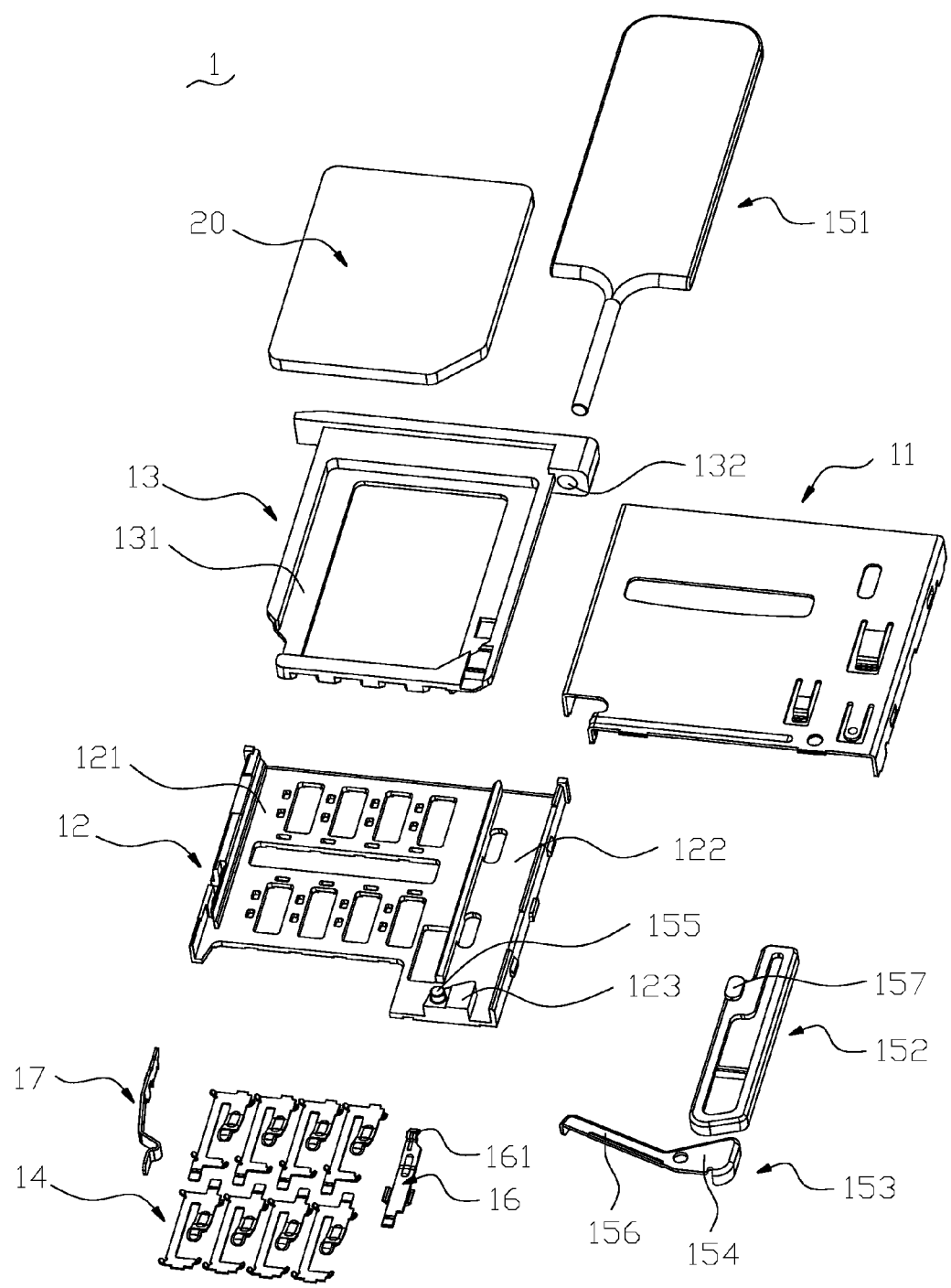
FIG. 4 is a more detail exploded view of the card connector shown in FIG. 2.

Referring now to FIGS. 2-4, a card connector 1 according to the present invention comprises a shell body 11, an insulating main body 12, a card carrier 13 and a plurality of conductive terminals 14 embedded within the insulating main body 12.

In this embodiment, the card connector 1 is provided for accommodating a SIM card 20 therein. When the SIM card 20 is inserted into the card connector 1, a use-to-telecommunicate portion of the SIM card 20 contacts with the conductive terminals 14 so as to establish an electrical communication with a PCB thereoutside. A conception of the present invention is that: the card connector 1 further comprises a retreating-card apparatus (not indicated) disposed on the insulating main body 12. The retreating-card apparatus can remove the SIM card 20 by using a lever principle, so as to conveniently dispose/withdraw the SIM card 20. Since the retreating-card apparatus is disposed inside the card connector 1, it can shorten the assembly time and lower the assembly cost thereof.

Figure 5:
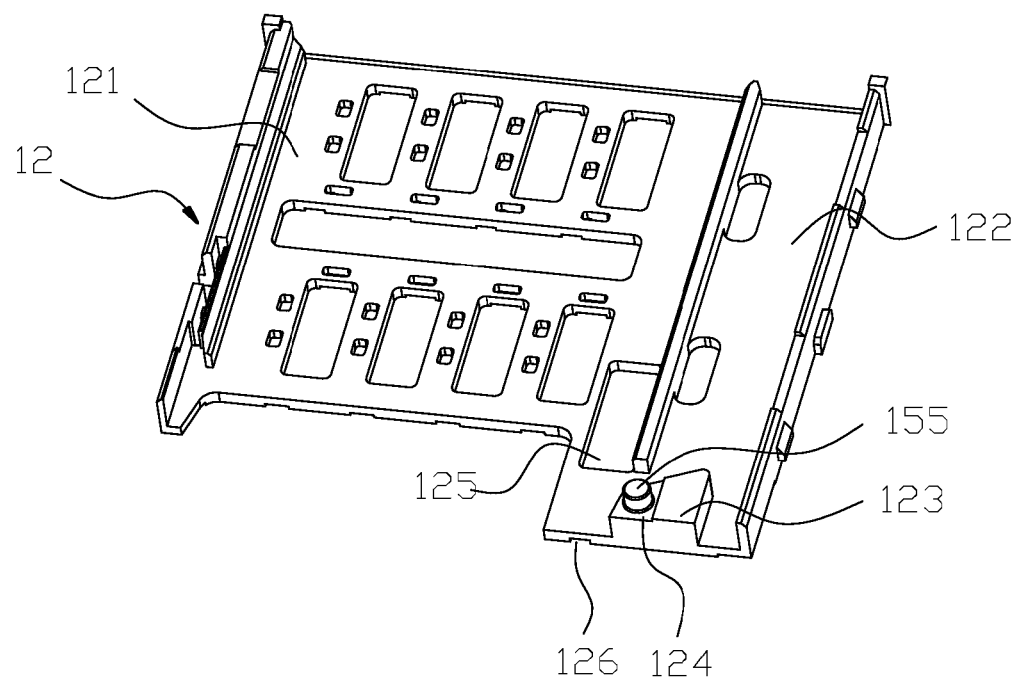
FIG. 5 is a perspective view of an insulating main body of the card connector shown in FIG. 2.

Referring now to FIGS. 4 and 5, the insulating main body 12 comprises a first installing portion 121, a second installing portion 122, and a third installing portion 123. Specifically speaking, the first installing portion 121 is formed with a plurality of grooves in which the conductive terminals 14 are disposed, respectively. The retreating-card apparatus comprises an actuator 151, a slider 152, and a linkage mechanism 153. The first installing portion 121 is used for supporting the card carrier 13, the second installing portion 122 is used for disposing the slider 152 of the retreating apparatus thereon and the third installing portion 123 is used for disposing the linkage mechanism 153 of the retreating-card apparatus thereon.

As shown in FIG. 4, the card carrier 13 is formed as a frame-like with an installing groove 131 for placing the SIM card 20. The card carrier 13 further has a through-hole 132 rearwardly defined beside a front end thereof and positioned correspondingly to the slider 152.

Referring now to FIGS. 3 and 4, as above mentioned, the retreating-card apparatus comprises the actuator 151, the slider 152, and the linkage mechanism 153. In this embodiment, the actuator 151 is equipped with a pin for actuating the slider 152. At the time when the SIM card 20 does not need to withdraw, the pin 151 is accommodated within the end user's device, such as a shell of a mobile phone. The slider 152 and the linkage mechanism 153 are disposed on the insulating main body 12. Specifically speaking, the slider 152 is disposed beside the card carrier 13, and an end of the linkage mechanism 153 is abutted against an end of the slider 152, besides the other end of the slider 152 is abutted against a rear end of the card carrier 13.

As above mentioned, the slider 152 is disposed on the second installing portion 122 and the linkage mechanism 153 is disposed on the third installing portion 123. When the pin of the actuator 151 pushes the slider 152 in a first direction 31 as directed by an arrow, the linkage mechanism 153 can be linked up with the slider 152 to facilitate the other end of the linkage mechanism 153 pushing the card carrier 13 in a second direction 32 opposite to the first direction 31 so that the card carrier 13 and the SIM card 20 can be removed from the insulating main body 12.

Preferably, in this embodiment, the slider 152 is disposed with a convex post 157, and the pin 151 pushes the convex post 157 to link up with the slider 152. The linkage mechanism 153 is realized in a cam mechanism, which comprises a cam 154, a fixed axle 155 and a driven member 156. The cam 154 is actuated by the slider 152 to rotate on the fixed axle 155 and thereby to make the driven member 156 pushing the card carrier 13. In this embodiment, the fixed axle 155 is disposed on the third installing portion 123. Specifically speaking, the third installing portion 123 has a staged part 124 (as shown in FIG. 5) which positions the cam 154 thereon and is formed with the fixed axle 155.

Referring now to FIGS. 4 and 5, the card connector 1 further comprises a latching member 16 used for tightly locking the card carrier 13. The first installing portion 121 of the insulating main body 12 is formed with an opening groove 125 and a concave groove 126. The latching member 16 has an abutting portion 161. The latching member 16 is inserted into the concave groove 126 whereby the abutting portion 161 of the latching member 16 protrudes through the opening groove 125 to abut against a bottom of the card carrier 13.

When the SIM card 20 and the card carrier 13 are located inside the insulating main body 12, the latching member 16 ensures a firm and stable securement among the SIM card 20, the card carrier 13 and an inside wall of the user's device. Preferably, the latching member 16 is made of a metallic material. The card connector 1 further comprises a switch terminal 17 embedded within a side of the insulating main body 12, so as to detect if the card carrier 13 and the SIM card 20 are inserted to or removed from the insulating main body 12.

As described above, the retreating-card apparatus of the card connector 1 according to the present invention is disposed inside the card connector 1 to construct lightly, thinly and compactly, and thereby save an inner space of the electric equipment such as mobile phone with a volume trending to light and thin, so that it can be suited for a light and thin electric equipment. Besides, the present invention is constructed simply and designed reasonably to shorten the time and lower the cost in assembling the card connector 1. Further, in the present invention, by the actuator 151 actuating the slider 152 to link up with the linkage mechanism 153 to push the card carrier 13, the card carrier 13 and the SIM card 20 can be removed from the insulating main body 12. Thus, such a retreating-card method reveals convenient, quick and reliable.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A card connector comprising a shell body, an insulating main body, a card carrier for supporting an electric card, and a plurality of conductive terminals embedded within the insulating main body, wherein the card connector further comprises a retreating-card apparatus disposed on the insulating main body and comprising an actuator, a slider actuated by the actuator, and a linkage mechanism linked up with the slider and disposed on a rear end of the card carrier, and when the actuator pushes the slider to move along a first direction, the linkage mechanism is linked up with the slider to push the card carrier in a second direction opposite to the first direction so that the card carrier and the electric card are removed from the insulating main body.

2. The card connector as claimed in claim 1, wherein the linkage mechanism comprises a cam, a fixed axle and a driven member, and the cam is actuated by the slider to rotate on the fixed axle so that the driven member pushes the card carrier.

3. The card connector as claimed in claim 2, wherein the actuator is a pin, and the slider has an end linked up with the pin and the other end linked up with the cam.

4. The card connector as claimed in claim 1, wherein the insulating main body comprises a first installing portion used for supporting the card carrier, and a second installing portion used for disposing the slider thereon.

5. The card connector as claimed in claim 2, wherein the insulating main body comprises a third installing portion used for disposing the cam thereon, and the fixed axle is fixed on the third installing portion.

6. The card connector claimed in claim 1, wherein the card connector further comprises a latching member used for locking the card carrier, and the latching member has an abutting portion used for abutting against a bottom of the card carrier.

7. The card connector claimed in claim 1, wherein the card connector further comprises a switch terminal embedded within a side of the insulating main body.

8. The card connector claimed in claim 1, wherein the card carrier forms in a frame-like, and the card carrier is formed with an installing groove for supporting the electric card.

\* \* \* \* \*